United States Patent
Lee et al.

(10) Patent No.: US 9,930,472 B2
(45) Date of Patent: Mar. 27, 2018

(54) MOBILE TERMINAL AND METHOD FOR CONTROLLING THEREOF

(71) Applicant: LG ELECTRONICS INC., Seoul (KR)

(72) Inventors: Hyunjung Lee, Seoul (KR); Kiwan Kim, Seoul (KR); Samsick Kim, Seoul (KR); Younghoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 665 days.

(21) Appl. No.: 14/478,825

(22) Filed: Sep. 5, 2014

(65) Prior Publication Data
US 2015/0065091 A1 Mar. 5, 2015

(30) Foreign Application Priority Data

Sep. 5, 2013 (KR) .......................... 10-2013-0106865

(51) Int. Cl.
*H04W 12/06* (2009.01)
*H04W 4/00* (2009.01)
(Continued)

(52) U.S. Cl.
CPC .......... *H04W 4/001* (2013.01); *G06F 3/1423* (2013.01); *G06F 3/1454* (2013.01);
(Continued)

(58) Field of Classification Search
CPC .. H04W 4/001; H04L 67/125; H04L 67/1095; H04L 67/148; H04M 1/67; H04M 1/7253
See application file for complete search history.

(56) References Cited

U.S. PATENT DOCUMENTS

2003/0217181 A1* 11/2003 Kiiskinen ......... G06F 17/30581
709/248
2005/0171939 A1* 8/2005 Fisher .............. G06F 17/30017
(Continued)

FOREIGN PATENT DOCUMENTS

CN 102550120 7/2012
CN 102708125 10/2012
(Continued)

OTHER PUBLICATIONS

PCT International Application No. PCT/KR2014/008383 Written Opinion of The International Searching Authority dated Dec. 24, 2014, 11 pages.
(Continued)

*Primary Examiner* — Qun Shen
(74) *Attorney, Agent, or Firm* — Lee, Hong, Degerman, Kang & Waimey

(57) ABSTRACT

The present invention relates to a mobile terminal and a method of controlling therefor, and more particularly, to a mobile terminal capable of seamlessly performing a same function in a manner of being synchronized with an external device and a method of controlling therefor. A method of controlling the mobile terminal according to one embodiment of the present invention can include the steps of establishing a data path with an external device, receiving application execution information of the external device from the external device, displaying a lock screen corresponding to the application execution information on a touch screen and if the lock screen is cancelled corresponding to a first application among the application execution information, executing the first application.

20 Claims, 14 Drawing Sheets

(51) Int. Cl.
  *H04L 29/08* (2006.01)
  *H04M 1/67* (2006.01)
  *H04M 1/725* (2006.01)
  *G06F 3/14* (2006.01)
  *H04W 4/18* (2009.01)

(52) U.S. Cl.
  CPC ........ *H04L 67/1095* (2013.01); *H04L 67/125* (2013.01); *H04L 67/148* (2013.01); *H04M 1/67* (2013.01); *H04M 1/7253* (2013.01); *G09G 2370/16* (2013.01); *H04M 2250/22* (2013.01); *H04W 4/18* (2013.01); *H04W 12/06* (2013.01)

(56) References Cited

U.S. PATENT DOCUMENTS

| | | | |
|---|---|---|---|
| 2008/0081558 A1 | 4/2008 | Dunko et al. | |
| 2011/0171907 A1* | 7/2011 | Jolivet | H04L 63/0492 455/41.1 |
| 2012/0021724 A1 | 1/2012 | Olsen et al. | |
| 2013/0086522 A1* | 4/2013 | Shimazu | G06F 3/04817 715/810 |
| 2014/0189527 A1* | 7/2014 | Kruglick | G06F 9/4443 715/746 |
| 2014/0359057 A1* | 12/2014 | Hensgen | H04L 67/1095 709/217 |
| 2015/0154015 A1* | 6/2015 | Ukai | H04M 1/72525 717/170 |

FOREIGN PATENT DOCUMENTS

| | | |
|---|---|---|
| CN | 103092702 | 5/2013 |
| CN | 103197963 | 7/2013 |
| KR | 10-2011-0040198 | 4/2011 |
| KR | 10-2013-0081068 | 7/2013 |
| WO | 2012096419 | 7/2012 |

OTHER PUBLICATIONS

State Intellectual Property Office of the People's Republic of China Application Serial No. 201480019140.1, Office Action dated Oct. 17, 2016, 23 pages.

European Patent Office Application Serial No. 14842186, Search Report dated Mar. 3, 2017, 8 pages.

* cited by examiner

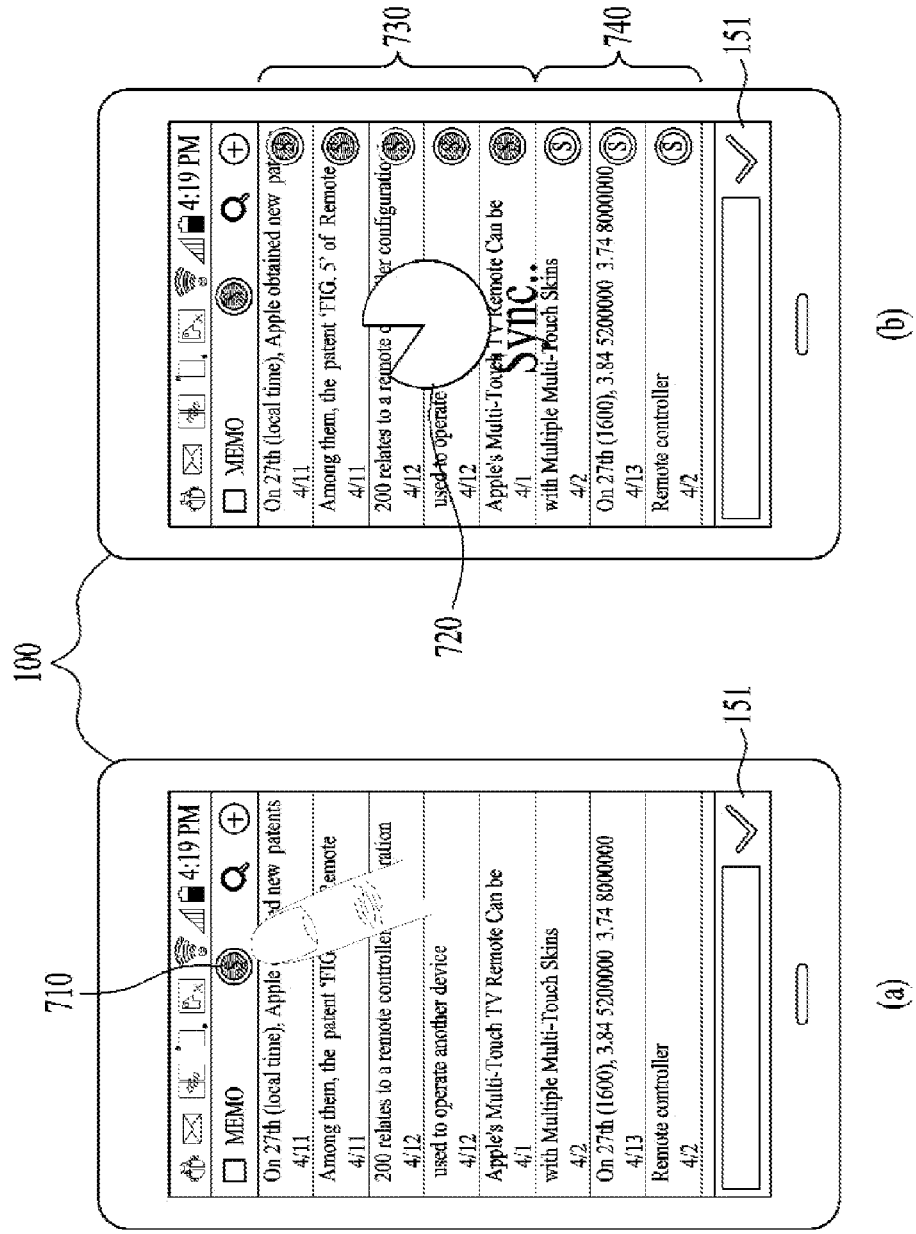

MOBILE TERMINAL AND METHOD FOR CONTROLLING THEREOF

CROSS-REFERENCE TO RELATED APPLICATIONS

Pursuant to 35 U.S.C. § 119(a), this application claims the benefit of earlier filing date and right of priority to Korean Patent Application No. 10-2013-0106865, filed on Sep. 5, 2013, the contents of which are all hereby incorporated by reference herein in its entirety.

BACKGROUND OF THE INVENTION

Field of the Invention

The present invention relates to a mobile terminal and a method of controlling therefor, and more particularly, to a mobile terminal capable of seamlessly performing a same function in a manner of being synchronized with an external device and a method of controlling therefor.

Discussion of the Related Art

A terminal can be classified into a mobile/portable terminal and a stationary terminal according to whether the terminal is portable. And again, the mobile terminal can be divided into a handheld terminal and a vehicle mount terminal according to whether the terminal is directly portable by a user.

As a function of the terminal is diversified, the terminal is implemented in a form of a multimedia player equipped with multiple functions such as capturing a picture or a video, playing music or a video file, receiving broadcast and the like.

In order to support and increase the functions of the terminal, it may consider improving a structural part and/or a software part of the terminal.

Recently, as a smart-type mobile terminal is disseminated, an identical function, i.e., an application can be driven by mobile terminals different from each other. Hence, when a user using a plurality of terminals is driving a specific application in a terminal, a necessity for satisfying a need of the user intending to seamlessly use the same application via a different terminal is arising.

SUMMARY OF THE INVENTION

Accordingly, the present invention is directed to an apparatus and method thereof that substantially obviate one or more problems due to limitations and disadvantages of the related art.

An object of the present invention is to provide a mobile terminal capable of seamlessly executing an application used to be executed by an external device and a method of controlling therefor.

When a task of an application used to be executed by an external device or an application itself is not terminated, another object of the present invention is to provide a mobile terminal capable of executing the application while the execution state is maintained as it is and a method of controlling therefor.

The other object of the present invention is to provide a mobile terminal capable of conveniently synchronizing data with an external device and a method of controlling therefor.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of controlling a mobile terminal includes the steps of establishing a data path with an external device, receiving application execution information of the external device from the external device, displaying a lock screen corresponding to the application execution information on a touch screen and if the lock screen is cancelled corresponding to a first application among the application execution information, executing the first application.

To achieve these objects and other advantages and in accordance with the purpose of the invention, as embodied and broadly described herein, according to one embodiment, a mobile terminal includes a wireless communication unit configured to establish a data path with an external device and receive application execution information of the external device from the external device, a touch screen configured to display a lock screen corresponding to the application execution information and if the lock screen is cancelled corresponding to a first application among the application execution information, a controller configured to execute the first application, if there is content not stored in the application execution information of the external device received from the external device in the middle of generating or modifying the content in the first application, the controller configured to control the not-stored content to be displayed on the first application.

To further achieve these objects and other advantages and in accordance with the purpose of the invention, as embodied and broadly described herein, according to a different embodiment, a method of controlling a mobile terminal includes the steps of establishing a data path with an external device, receiving application execution information of the external device from the external device, turning on a touch screen, displaying a display object corresponding to a first application among the application execution information on the touch screen and if the display object is selected, executing the first application.

To further achieve these objects and other advantages and in accordance with the purpose of the invention, as embodied and broadly described herein, according to a different embodiment, a mobile terminal includes a wireless communication unit configured to establish a data path with an external device and receive application execution information of the external device from the external device, a touch screen and a controller configured to display a display object corresponding to a first application among the application execution information when the touch screen is turned on and if the display object is selected, the controller configured to execute the first application.

According to the present invention, although an operating device is changed by a user, a specific application used to be executed in a previous device can be seamlessly executed by a changed device.

In particular, when a task of an application used to be executed by an external device or an application itself is not terminated, a user can conveniently determine whether to execute the application on a lock screen while an execution state is maintained as it is.

And, a user checks whether a data of an external device is changed and can selectively select whether to synchronize the data.

Effects obtainable from the present invention are non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for an example of a method for a mobile terminal to perform content synchronization according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
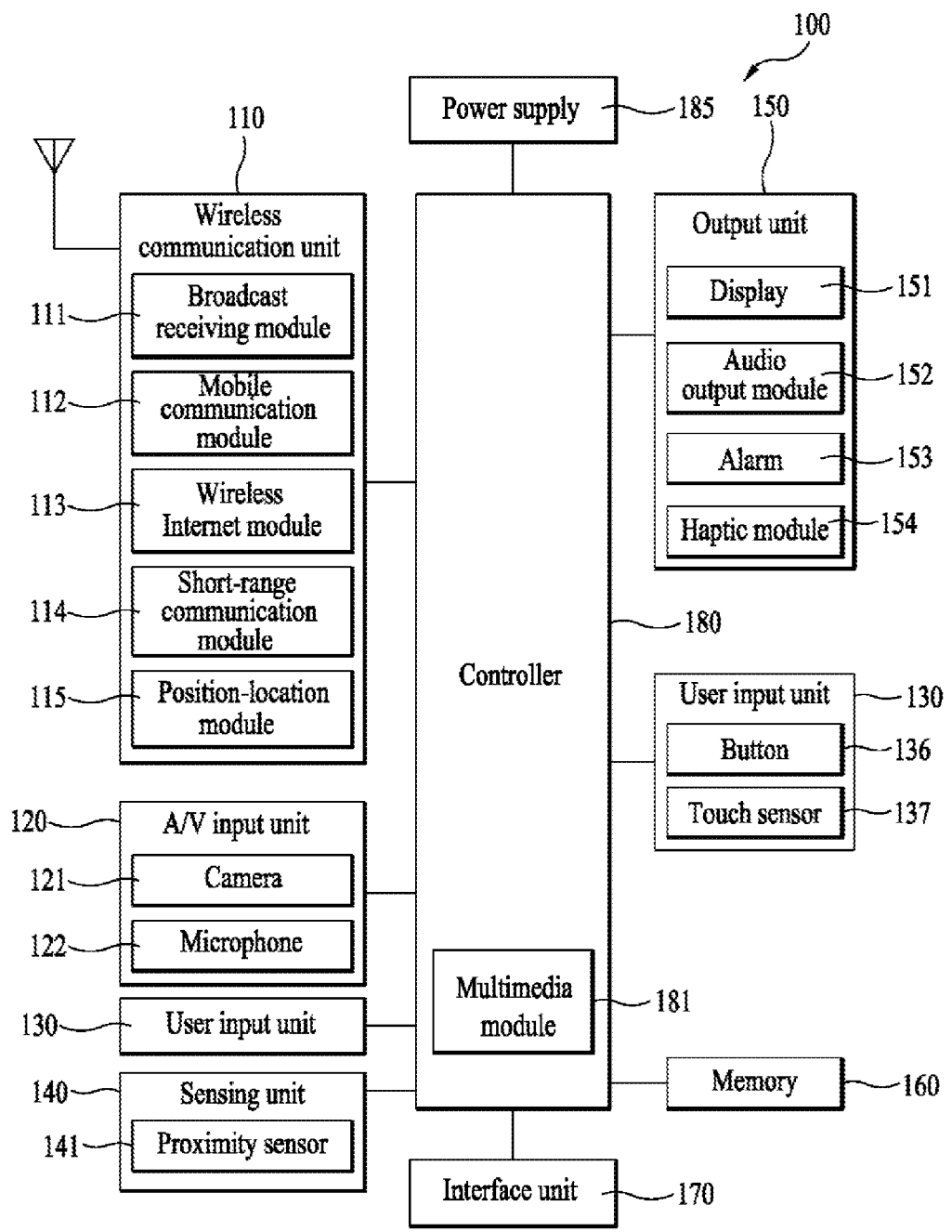
FIG. 1 is a block diagram for a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
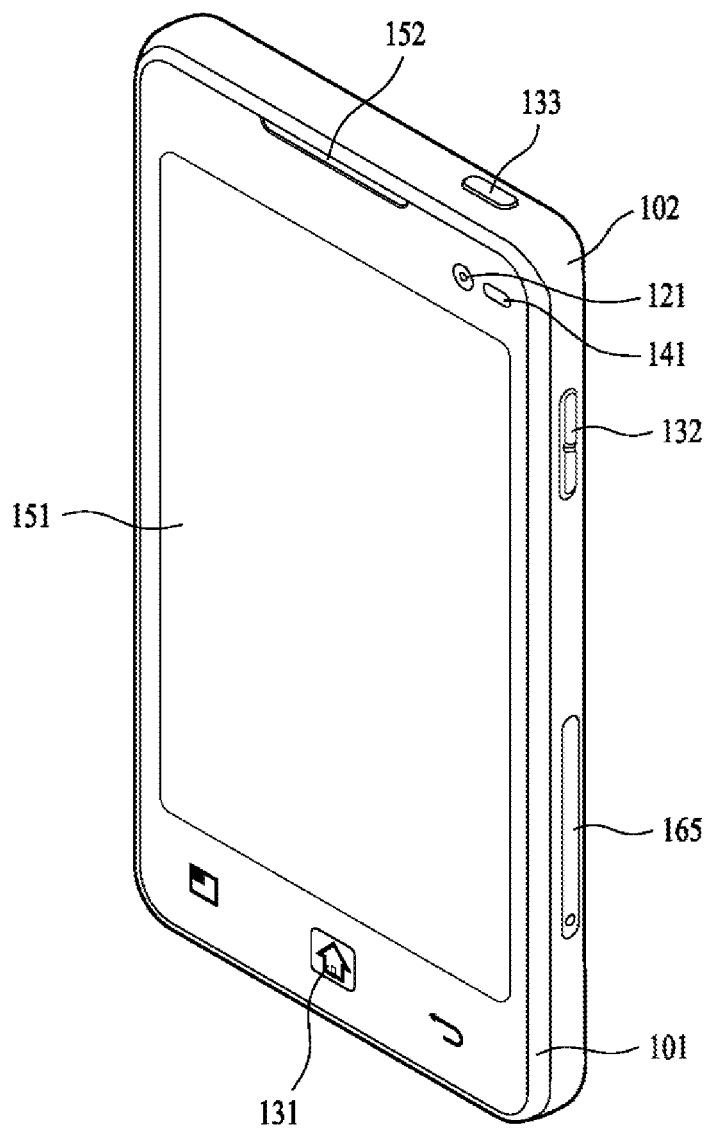
FIG. 2 is a front-side perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Providing Continuity of Application in Devices Different from Each Other

One embodiment of the present invention proposes a method for a mobile terminal to seamlessly perform a task used to be performed in an application using execution information of the application used to be executed in an external device in a state that the mobile terminal and the external device are connected with each other via a prescribed data path. In this case, the seamless task performance means that a progress status of a task used to be performed in one device is continued in another device as it is. For instance, in a state that a specific video has been played for 1 minute and 10 seconds in an external device, if a user changes an operating device into a mobile terminal, the mobile terminal plays the video from the 1 minute and 11 seconds in succession. The aforementioned case belongs to the seamless task performance.

For clarity, assume that the external device corresponds to a smartphone and the mobile terminal corresponds to a tablet type. Of course, this is just an example. A type of the external device and a type of the mobile terminal may be opposite to each other, both types may correspond to a smartphone type or both types may correspond to a tablet type.

Figure 3:
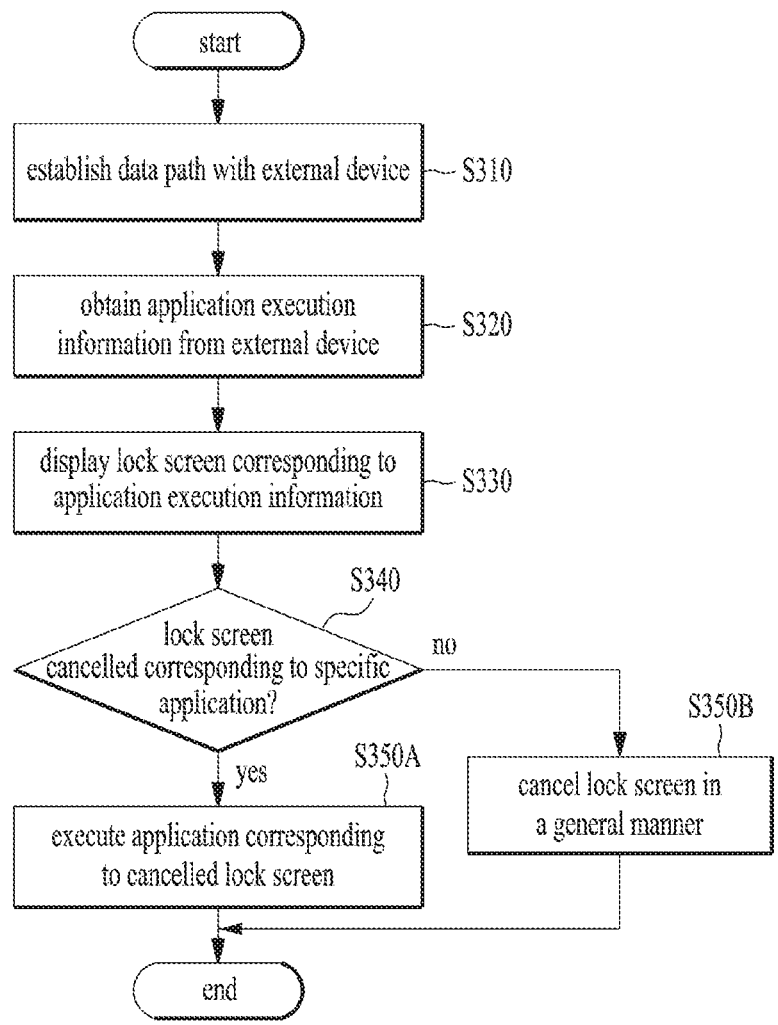
FIG. 3 is a flowchart for an example of a process for a mobile terminal to seamlessly execute an application used to be executed by an external device according to one embodiment of the present invention.

FIG. 3 is a flowchart for an example of a process for a mobile terminal to seamlessly execute an application used to be executed by an external device according to one embodiment of the present invention.

Referring to FIG. 3, first of all, a data path can be established with an external device [S310]. The data path establishment can be implemented by various short range communication methods such as Wi-Fi Direct, DLNA (digital living network alliance), Bluetooth and the like. Of course, this is just an example. If data is able to be exchanged between an external device and a mobile terminal 100 according to a predetermined protocol, the data path establishment may not be limited to any scheme. The data path establishment can be performed in a manner that a user inputs a data path establishment command to a mobile terminal or an external device. Or, the data path establishment can be performed when a prescribed condition (e.g., arriving at a specific time or a position, detecting a different device from at least one or more devices via a periodic scan) is satisfied.

If the data path is established, the mobile terminal can obtain application execution information from the external device via the established data path [S320]. In this case, the application execution information may mean information required for the mobile terminal to seamlessly execute an application currently executed or an application used to be executed in the external device including application identification information indicating a type of a recently executed application or an application currently executed in the external device, application usage history and the like. And, the usage history may include a list of playback/read contents, playback progress, a screenshot of a currently executing image and the like. The application execution information can be obtained by the mobile terminal based on an event (e.g., a task status change such as execution/termination of an application and start/end of reading content in a currently executing application, activation/deactivation of a touch screen of the external device and/or the mobile terminal). Or, the application execution information can be obtained with a prescribed period.

Subsequently, in case of operating the mobile terminal 100 by a user, for instance, if uplifting of the mobile terminal of the user is detected by the sensing unit 140 or the user controls a home key button, the controller 180 can display a lock screen corresponding to application execution information [S330]. In this case, the lock screen may correspond to a screen displayed in a state that at least a part of functions (e.g., entering a home screen and the like) except a specific function provided on the lock screen is restricted until a command input of a specific type is inputted. To correspond to the execution information may indicate that information corresponding to the application execution information is displayed on a specific area on the lock screen. Moreover, the information corresponding to the application execution information may include a screenshot of a last execution screen, a text describing a last execution status, a text/symbol/image indicating a type of a recently executed application and the like.

When the lock screen is displayed, in order to make an application providing continuity to be specified, in particular, if the lock screen is cancelled to make the lock screen correspond to a specific application [S340], the controller 180 can execute the application [S350A]. In this case, a state of the application lastly executed in the external device can be displayed as it is to provide continuity of a task to a user. If the lock screen is cancelled by a general method without corresponding to the specific application, the mobile terminal may display a home screen or an image displayed before a touch screen 151 is off [S350B].

In the following, a detail case of seamlessly executing various applications, which are used to be executed in the external device, in the mobile terminal is explained with reference to drawings. In the following drawings, assume that a data path establishment has completed between the mobile terminal and the external device.

Figure 4:
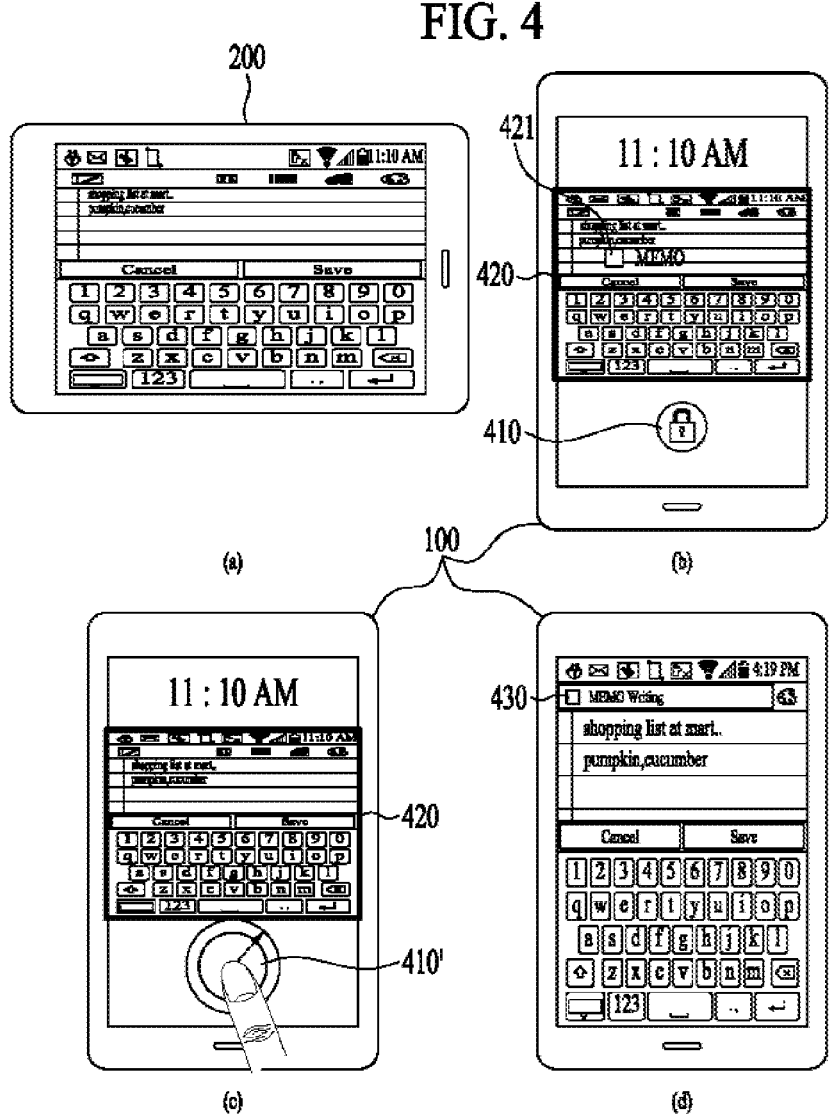
FIG. 4 is a diagram for an example of a form for a mobile terminal to seamlessly make a memo used to be made by an external device according to one embodiment of the present invention.
Figure 5:
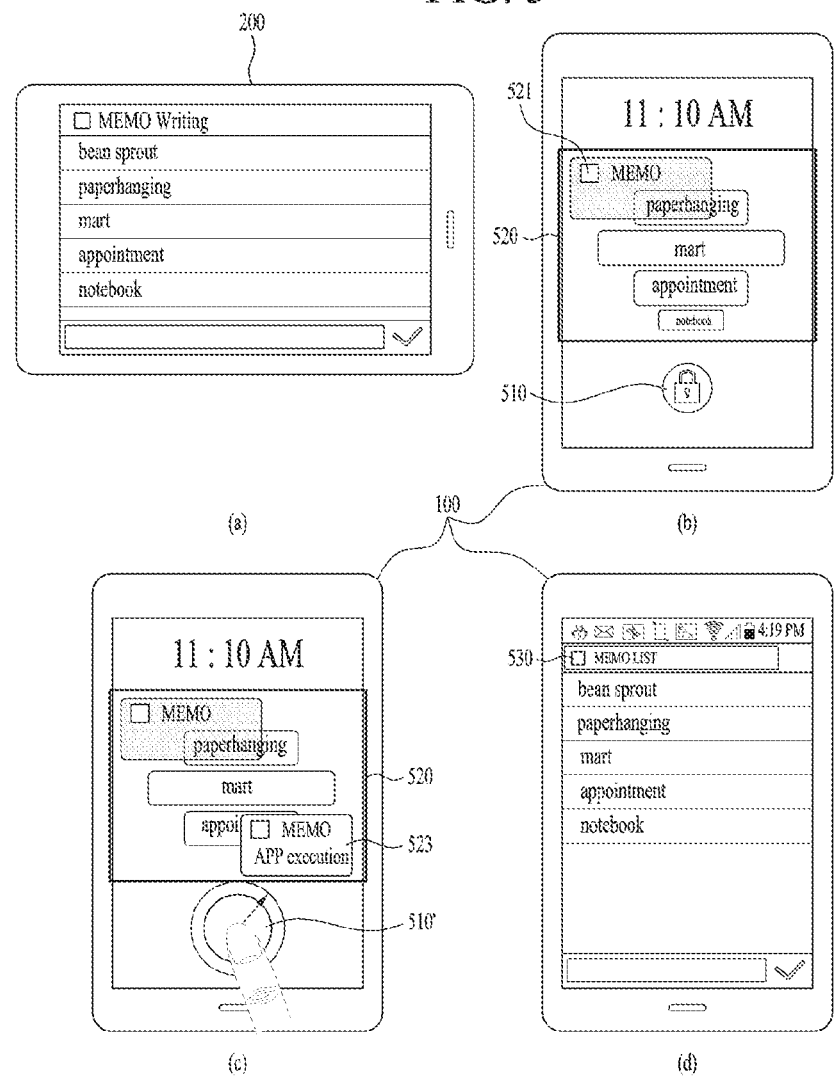
FIG. 5 is a diagram for an example of a form for a mobile terminal to seamlessly read a memo used to be read by an external device according to one embodiment of the present invention.

First of all, a case of an application capable of making/editing content is explained with reference to FIG. 4 and FIG. 5 in the following. In FIG. 4 and FIG. 5, assume that the application capable of making/editing content corresponds to a memo application. Yet, this is just an example for clarity of explanation. The content according to the present invention may include a text, multimedia content, SNS/blog posting and the like and the content may have no limit on a name or a type if the content is capable of being made/edited.

FIG. 4 is a diagram for an example of a form for a mobile terminal to seamlessly make a memo used to be made by an external device according to one embodiment of the present invention.

Referring to FIG. 4(a), it shows a state that storing a memo used to be made by the external device 200 via a memo application is not completed.

In this case, if a user calls a lock screen in a manner of operating the mobile terminal 100 (e.g., uplifting or tapping the mobile terminal or operating a specific key button), the lock screen can be displayed as shown in FIG. 4 (b). An indicator 410 for cancelling a lock screen state and application information 420 according to application execution information are displayed in the lock screen. In the present invention, assume that a method of cancelling the lock screen state is to drag the indicator 410 more than a prescribed distance. More specifically, the application information 420 may display an application lastly executed in the external device, i.e., a screenshot of a last execution screen of the memo application and an icon 421 corresponding to a source device (the external device) of the application. With the help of the application information 420, a user can obtain information on a type of an application capable of being seamlessly executed and execution state of the application.

In this case, as shown in FIG. 4 (c), the user drags a pointer to an area in which the application information 420 is displayed while touching an indicator 410 configured to cancel a lock screen state and may be then able to cancel the touch input. In this case, if the touch input configured to cancel the lock screen state is detected on the indicator 410, the controller 180 can change a shape of the indicator 410' to visually indicate the touch input. By doing so, as shown in FIG. 4 (d), the lock screen state is cancelled and a memo application can be executed on a touch screen of the mobile terminal 100. At this time, similar to the last state of the memo application in the external device, the memo application can be executed in the mobile terminal in a state that a memo is in the middle of being written down without being stored. Information 430 indicating an operation used to be executed in the external device can be additionally displayed on the memo application of the mobile terminal.

If dragging of a touch-drag input started from the indicator configured to cancel the lock screen state is cancelled on an area except the area on which the application information 420 is displayed, it may display a home screen or an execution image used to be displayed on the mobile terminal before entering a lock screen.

In the following, a case of calling a lock screen of the mobile terminal in a state that a video application has terminated in the external device is explained with reference to FIG. 5.

FIG. 5 is a diagram for an example of a form for a mobile terminal to seamlessly read a memo used to be read by an external device according to one embodiment of the present invention.

Referring to FIG. 5 (a), a list of memos, which is stored in the external device 200 in a manner of executing a memo application, can be displayed. The list can be displayed when a new memo is written and stored. Or, the list may be displayed in a state that editing of a previously written memo is completed. The list may be initially displayed immediately after a memo application is executed.

In this case, if a user calls a lock screen by operating the mobile terminal 100 (e.g., uplifting or tapping the mobile terminal or operating a specific key button), the lock screen can be displayed as shown in FIG. 5 (b). The lock screen displays an indicator 510 configured to cancel a lock screen state and application information 520 according to application execution information. More specifically, the application information 520 may display a last execution screen of a memo application lastly executed in the external device, i.e., a memo list together with an icon 521 corresponding to a source device (external device) of the application. With the help of the application information 520, the user can obtain more detail information on a type of an application capable of being seamlessly executed.

In this case, as shown in FIG. 5 (c), the user drags a pointer to an area in which the application information 520 is displayed while touching an indicator 510 configured to cancel a lock screen state and may be then able to cancel the touch input. Or, the user drags the pointer to an application indicator 523, which is displayed according to the touch of the indicator 510, capable of being seamlessly executed and may be then able to cancel the touch input. In this case, if the touch input configured to cancel the lock screen state is detected on the indicator 510, the controller 180 can change a shape of the indicator 510' to visually indicate the touch input. By doing so, as shown in FIG. 5 (d), the lock screen state is cancelled and a memo application can be executed on a touch screen of the mobile terminal 100. At this time, similar to the last state of the memo application in the external device, the memo application can be executed in the mobile terminal in a state that the memo list is displayed. Information 530 indicating an operation used to be executed in the external device can be additionally displayed on the memo list of the mobile terminal as well.

Meanwhile, although a user intends to seamlessly perform a task used to be performed in the external device, there may exist a case that an identical application used for performing the task is not installed in the mobile terminal. In this case, the controller 180 of the mobile terminal can provide a list of substitute applications providing a similar function to the user to perform the task. Regarding this, it shall be described with reference to FIG. 6 in the following.

Figure 6:
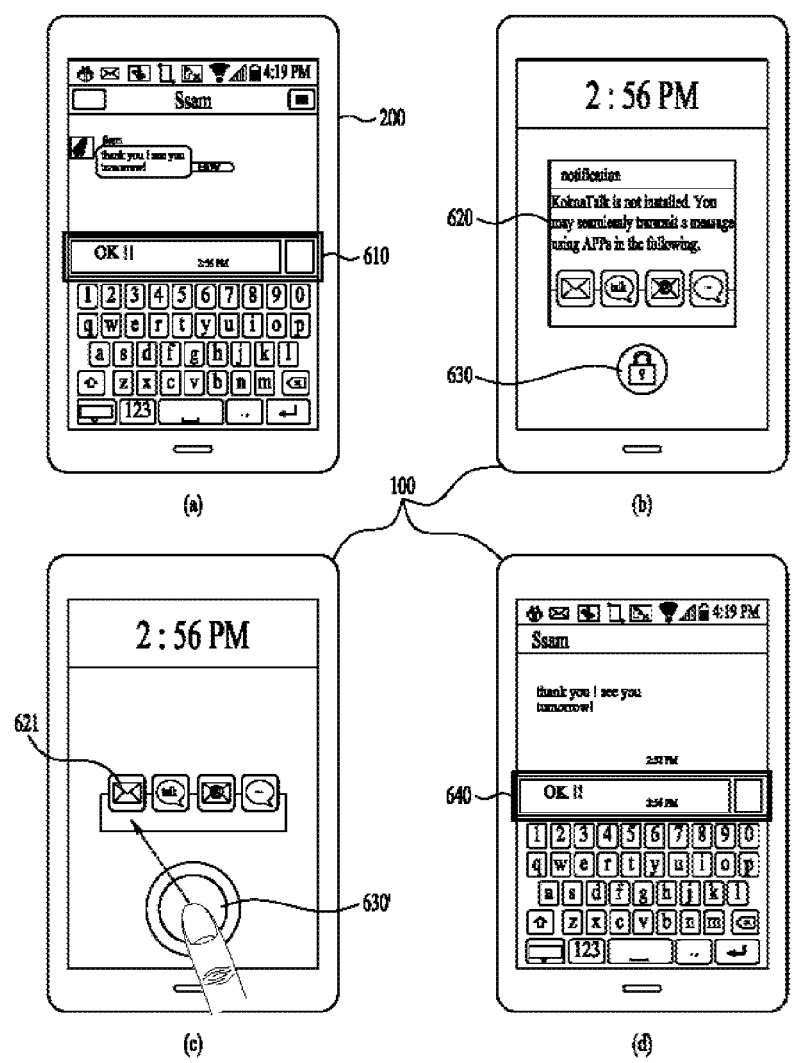
FIG. 6 is a diagram for an example of a form for a mobile terminal to provide continuity of a task used to be performed by an external device via a substitute application according to one embodiment of the present invention.

FIG. 6 is a diagram for an example of a form for a mobile terminal to provide continuity of a task used to be performed by an external device via a substitute application according to one embodiment of the present invention.

Referring to FIG. 6 (a), it shows a screen in which a message 610 to be transmitted to a specific counterpart is written in a manner that a messenger application is executed in the external device 200. In this case, as shown in FIG. 6 (b), the mobile terminal may call a lock screen in a state that the written message 610 is not transmitted. The controller 180 determines a type of an application lastly executed in the external device via application execution information. If the application is not installed in the mobile terminal, the controller determines substitute applications capable of providing a function similar to that of the application among applications installed in the mobile terminal in advance and may be then able to display a list 620 of the substitute applications on the lock screen. In this case, as shown in FIG. 6 (c), if a user drags an indicator 630 configured to cancel a lock screen state to an icon 620 corresponding to an SMS application among icons corresponding to the substitute applications displayed on the list, the lock screen state is cancelled and the SMS application can be executed as shown in FIG. 6 (d). In this case, a text used to be written in the external device can be automatically inputted in a message input box 640 of the SMS application. Besides the text used to be written in the external device, messages, which have been transmitted and received via a messenger application before the text is written, can also be displayed via the SMS application.

In the following, a method of synchronizing content between an external device and a mobile terminal according to one embodiment of the present invention is explained with reference to FIG. 7 to FIG. 10.

FIG. 7 is a diagram for an example of a method for a mobile terminal to perform content synchronization according to one embodiment of the present invention. In FIGS. 7 to 10, assume that content corresponds to a memo item pre-stored in a memo application. And, in FIG. 7, assume that memos are written in the mobile terminal 100 only and there is no chance of synchronization of the memos in the external device.

Referring to FIG. 7 (a), a list of stored memos can be displayed on a touch screen 151 of the mobile terminal 100 by executing the memo application. In this case, if a synchronization icon 710 is selected, as shown in FIG. 7 (b), an indicator 720 indicating that synchronization is in progress is displayed and the stored memos can be transmitted to the external device with which a data path is established. As the synchronization is performed, an indicator indicating that the synchronization is completed can be displayed on lists 730 of which transmission is completed. An indicator indicating that the synchronization is in progress can be displayed on lists 740 of which transmission is in progress.

In the following, a method of performing synchronization in case that a preexisting memo item is modified is explained with reference to FIG. 8a and FIG. 8b.

Figure 8A:
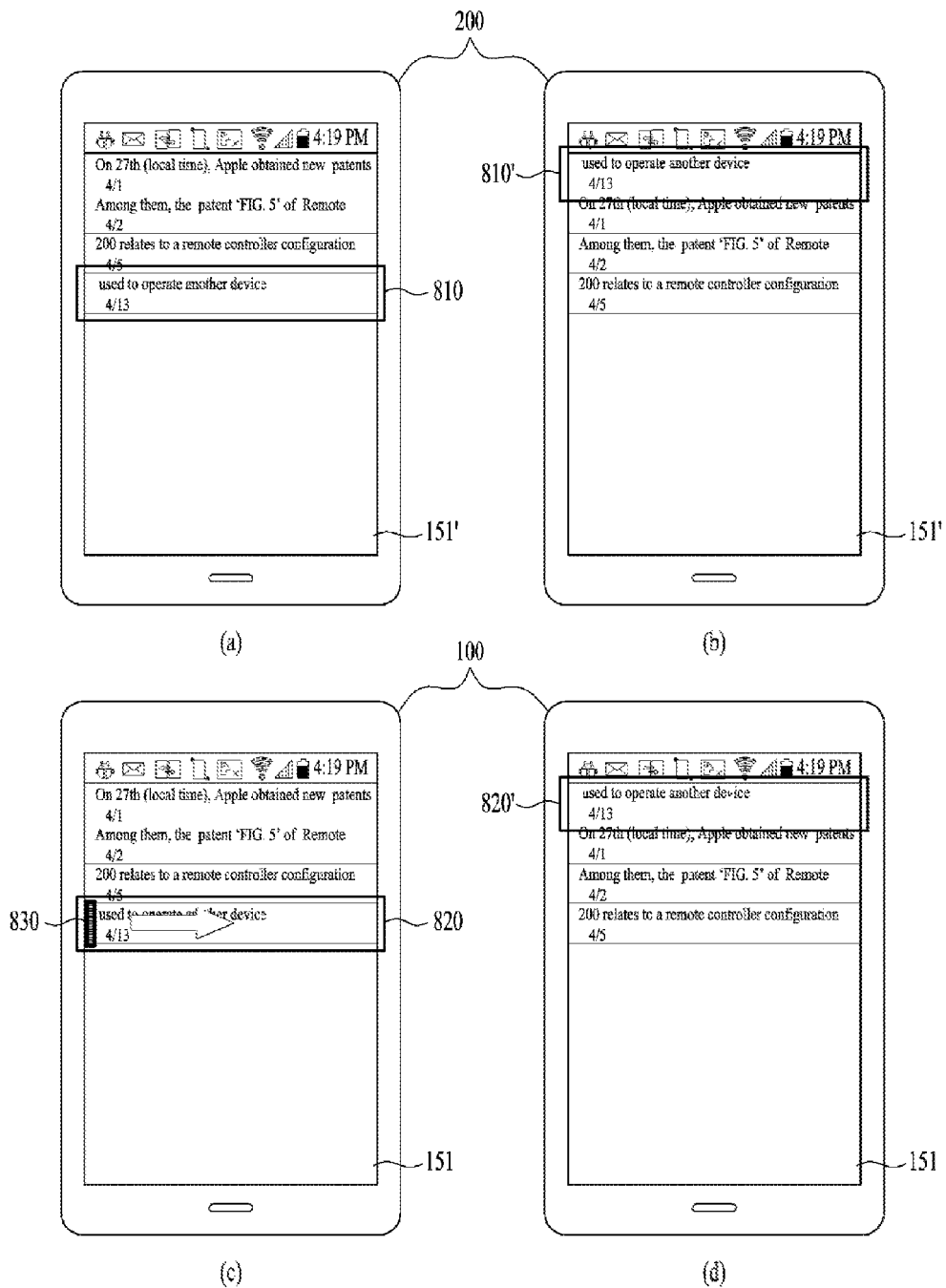
FIGS. 8*a* and 8*b* are diagrams for an example of a method for a mobile terminal to perform synchronization according to one embodiment of the present invention in case that content is modified in an external device.
Figure 8B:
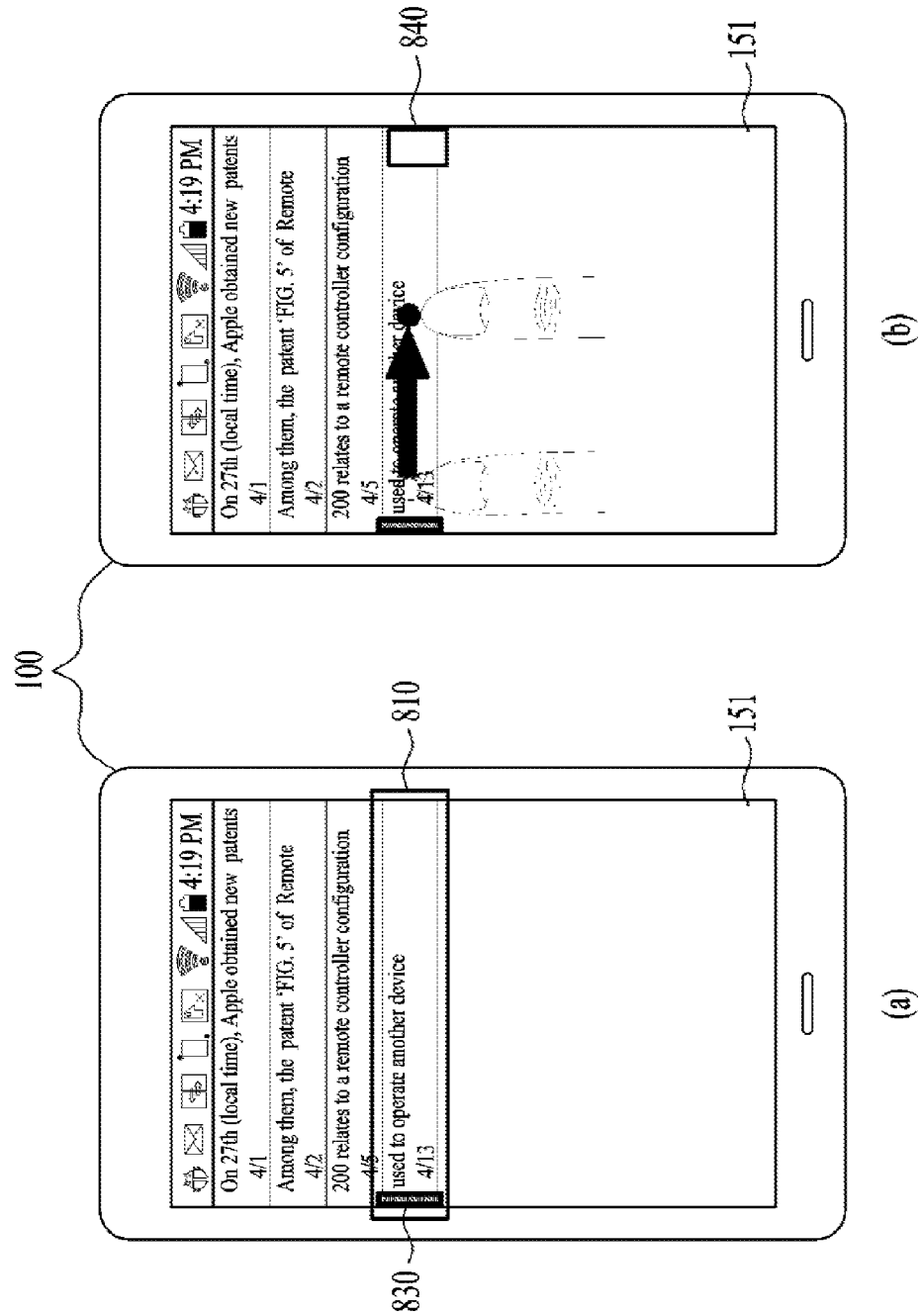

FIGS. 8a and 8b are diagrams for an example of a method for a mobile terminal to perform synchronization according to one embodiment of the present invention in case that content is modified in an external device. In FIG. 8a and FIG. 8b, assume that memo synchronization has been already performed between the mobile terminal and the external device and each memo item is arranged from the top part of a list in an order of most recently written or updated.

Referring to FIG. 8a (a), a memo list is displayed in the external device 200 via a memo application. In this case, if a user of the external device 200 modifies a memo 810 situating at the bottom of the memo list and stores the memo, since the memo 810' corresponds to a most recent memo item, the memo 810' can be displayed at the top of the memo list as shown in FIG. 8a (b). A modification history of the memo item can be notified to the mobile terminal via application execution information. Hence, as shown in FIG. 8a (c), when the memo application is executed in the mobile terminal, an update indicator 830 can be displayed on an item 820 corresponding to the memo item updated in the external device. In this case, as shown in FIG. 8a (d), if a user drags the update indicator to one direction (in this case, a right direction), synchronization is performed and the corresponding item 820' can be arranged at the top of the memo list. The user can check which item is updated via the aforementioned update indicator and may be than able to determine whether to perform synchronization.

Meanwhile, as shown in FIG. 8b (a), when the update indicator 830 is displayed on the memo item 820 corresponding to the item modified in the external device, if a user drags the update indicator to near a center of a screen, it may be able to display a source indicator 840 corresponding to the external device in which the modification of the corresponding item has occurred as shown in FIG. 8b (b). In this case, if the user cancels the drag, synchronization is not performed. On the contrary, if the user drags the update indicator to the right end of the screen, it may be able to configure the synchronization to be performed. As mentioned in the foregoing description, if operations are divided according to a drag range, a user can check a source of an item update and may be then able to determine whether to perform synchronization.

In the following, a method of performing content synchronization in case that content stored in the external device and content stored in the mobile terminal are different from each other and a method of displaying synchronized contents to a user in a manner of visually distinguishing the contents from each other are explained with reference to FIG. 9.

Figure 9:
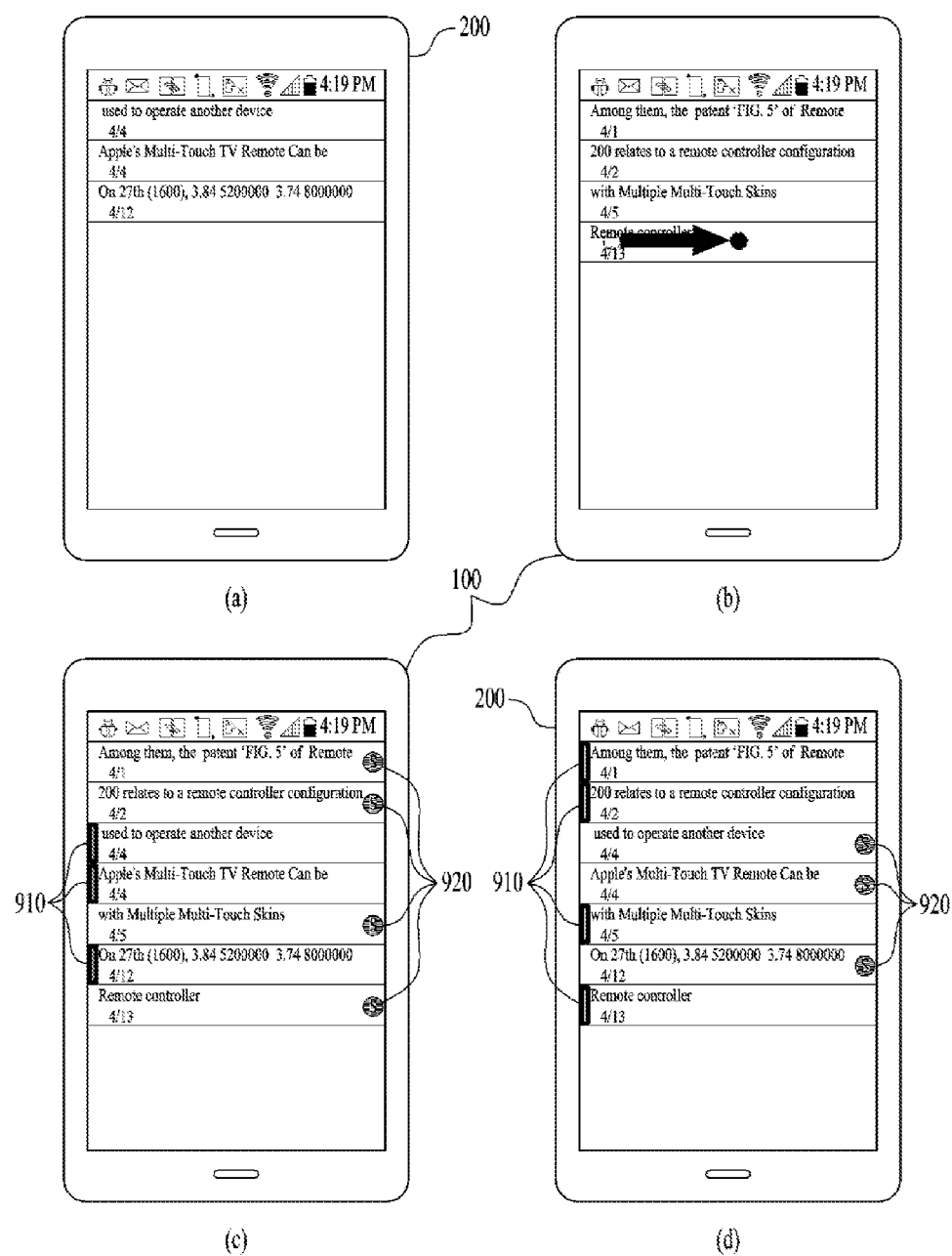
FIG. 9 is a diagram for an example of a method for a mobile terminal to perform content synchronization with an external device and visually provide a result of the content synchronization to a user according to one embodiment of the present invention.

FIG. 9 is a diagram for an example of a method for a mobile terminal to perform content synchronization with an external device and visually provide a result of the content synchronization to a user according to one embodiment of the present invention. In FIG. 9, assume that a memo item stored in the external device and a memo item stored in the mobile terminal are different from each other.

As shown in FIG. 9 (a), 3 memo items are stored in the external device. As shown in FIG. 9 (b), 4 memo items are stored in the mobile terminal. In this case, a user can input a touch-drag command to a random item on a touch screen. When the touch-drag command is inputted, synchronization is performed. By doing so, as shown in FIG. 9 (c), the 3 memo items used to be stored in the external device can be displayed together with the 4 memo items on the mobile terminal and an arrangement order may become a writing/modification time order. In this case, a reception indicator 910 can be given to the items received from the external device. On the contrary, a transmission indicator 920 can be given to the items transmitted to the external device. As shown in FIG. 9 (d), each of the indicators can be displayed in the external device in opposition to the indicators given to the mobile terminal. Of course, no indicator can be displayed on an item (not depicted) of which synchronization has already completed. And, in case of the item of which the synchronization has already completed, if one of the mobile terminal and the external device modifies the item, the update indicator mentioned earlier in FIGS. 8A and 8B can be displayed on the item. In this case, it is preferable to visually distinguish the update indicator from the reception/transmission indicator. In case of updating via the update indicator, a transmission indicator can be displayed on a corresponding item in a side in which the modification item is transmitted and a reception indicator can be displayed on a corresponding item in a side in which the modification item is received. And, although it is not depicted, if a transmission indicator of a specific item on which the transmission indicator is displayed is selected by a touch input, synchronization of the specific item may be cancelled.

Meanwhile, it is able to configure an indicator to be always displayed on an item becoming a target of synchronization. And, it may be able to indicate whether it is necessary to perform an update using a form of an indicator. Regarding this, it shall be described with reference to FIG. 10 in the following.

Figure 10:
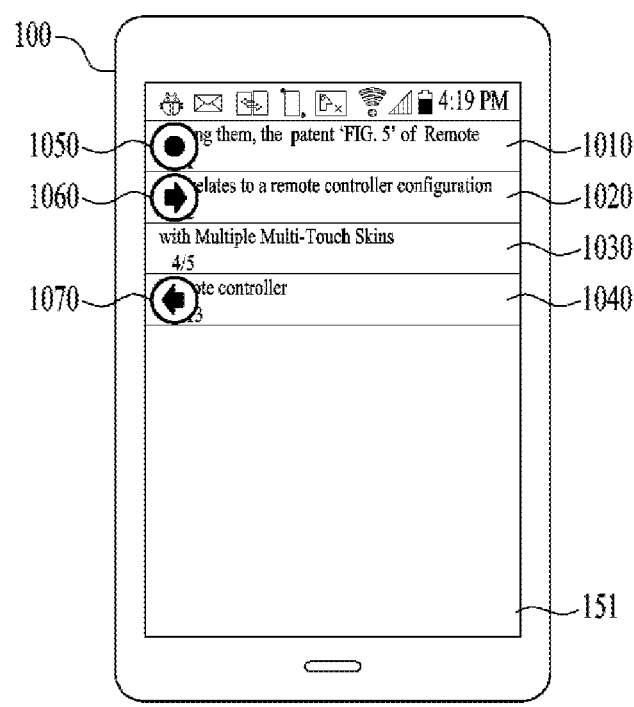
FIG. 10 is a diagram for an example of an indicator type indicating a synchronization state according to one embodiment of the present invention.

FIG. 10 is a diagram for an example of an indicator type indicating a synchronization state according to one embodiment of the present invention.

In FIG. 10, assume that 4 memo items (1010 to 1040) are stored in the mobile terminal And, assume that a first item 1010, a second item 1020 and a fourth item 1040 are set to apply a synchronization function and a third item 1030 is set not to apply the synchronization function.

In this case, if it is not necessary to update the first item 1010 since the first item 1010 is in a state identical to that of the external device, a first type indicator 1050 indicating that the first item is maintained in a latest state can be displayed on the first item. If a modification occurs on the second item 1020 in the mobile terminal, it may display a second type indicator 1060 on the second item to indicate that it is necessary to perform synchronization to transmit the corresponding item to the external device. And, if a modification occurs on the fourth item 1040 in the external device, it may display a third type indicator 1070 on the fourth item to indicate that it is necessary to perform synchronization to receive the corresponding item from the external device. When a user drags an item on which the second type indicator or the third type indicator is displayed, synchronization can be performed. When the synchronization is completed, the first type indicator can be displayed on each item until a change occurs on the corresponding item.

In the aforementioned synchronization method according to the present invention, it is described as synchronization is performed according to a drag operation or a touch of a synchronization icon. Yet, a specific item can be automatically synchronized according to a configuration without a command input. Or, synchronization can be always performed on the basis of items stored in the mobile terminal according to each item irrespective of whether an item is modified in a different side. On the contrary, synchronization can be performed on the basis of items stored in the external device as well.

Meanwhile, in performing synchronization, in case of contents of which a partial part is overlapped with each other instead of being completely matched with each other, for instance, in case that a number of a contact list is identical to each other but a stored name is different from each other, it may display a user interface (not depicted) configured to receive a selection from a user on a reference of synchronization among the mobile terminal and the external device. Moreover, in case of synchronizing content of a writing or a drawing form written or drawn by a stylus pen and the like, when the content is displayed, a blank may occur in one of the devices due to a resolution difference or a size difference of a display between the mobile terminal and the external device. In this case, it may be able to make an additional function menu and the like capable of being provided to an area in which the blank has occurred to be additionally displayed.

In the following, when a file is attached, an example for a form of performing synchronization is explained with reference to FIG. 11 and FIG. 12.

Figure 11:
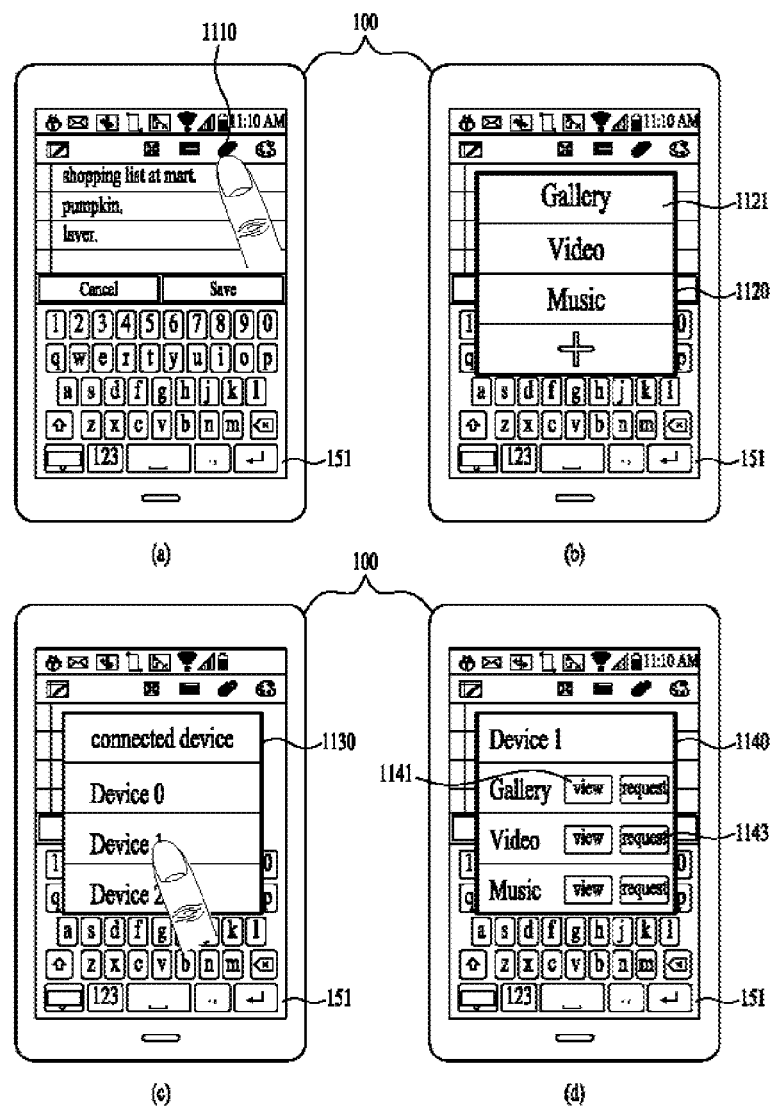
FIGS. 11 and 12 are diagrams for an example of a method for a mobile terminal to attach a file of an external device while content is making according to one embodiment of the present invention.
Figure 12:
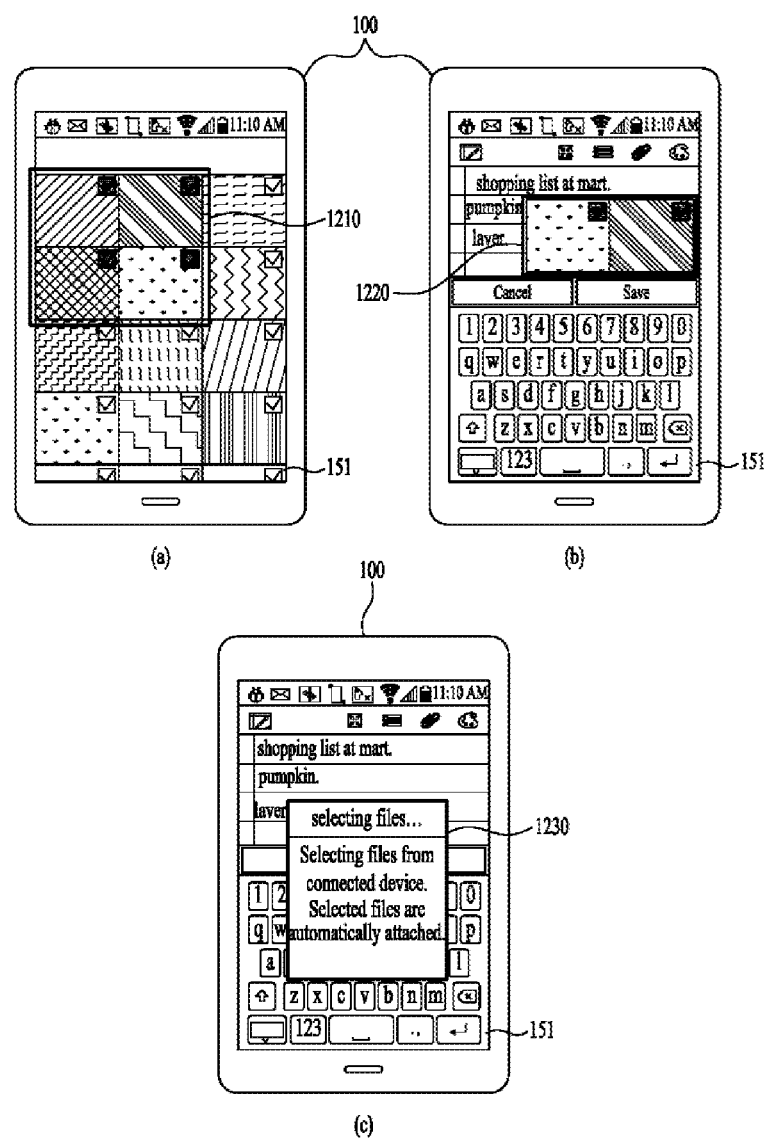

FIGS. 11 and 12 are diagrams for an example of a method for a mobile terminal to attach a file of an external device while content is making according to one embodiment of the present invention.

Referring to FIG. 11 (*a*), it is able to select a file attachment icon 1110 while a memo is writing in the mobile terminal By doing so, as shown in FIG. 11 (*b*), a pop-up window 1120 configured to receive a selection of a file category can be displayed. In this case, if a user selects a gallery 1121, as shown in FIG. 11 (*c*), it may display a list 1130 of external devices possessing an image file among the external devices of which a data path is established with the mobile terminal. As shown in FIG. 11 (*d*), if an external device 1 is selected from the list of the external devices, a pop-up window 1140 configured to receive a selection of a file selection scheme can be displayed according to a file category supported by the external device 1.

If a view menu 1141 is selected from the pop-up window 1140, as shown in FIG. 12 (*a*), thumbnails respectively corresponding to the image files stored in the corresponding external device can be displayed via the mobile terminal. In this case, as shown in FIG. 12 (*b*), images corresponding to thumbnails 1210 selected via check boxes can be attached to the memo in progress. In this case, the image files possessed by the external device can be attached to the memo in a form of being copied to the mobile terminal or can be attached to the memo in a form of a short cut for the files. In case of attaching the images in the form of the short cut, it is preferable to establish a data path to make the images deliver to the mobile terminal from the external device when the attached images are read in the memo. And, in case of attaching a video or music content in the form of the short cut, if it is necessary to play the video or the music content, the mobile terminal may play the content in a manner of streaming the content from the external device. Of course, although the images are attached in the form of the short cut, it may display a separate menu configured to store a file itself by directly downloading the file from the external device.

On the contrary, when a request menu 1143 is selected from the pop-up window 1140, as shown in FIG. 12 (*c*), a message 1230 indicating that a file is selected from the external device can be outputted on the mobile terminal and a screen similar to FIG. 12 (*a*) can be displayed on the external device. In particular, an image to be attached to a memo, which is written in the mobile terminal, can be directly selected from the external device. As mentioned in the foregoing description, since a process following after the selection of an attachment file from the external device is similar to FIG. 12 (*b*), for clarity of the specification, explanation on the duplicated part is omitted at this time.

Meanwhile, if a menu item accompanied with an attachment file is synchronized by one of the aforementioned methods, the attachment file can be synchronized as well.

According to a different embodiment of the present invention, in providing task continuity, instead of immediately displaying a task lastly displayed in the external device in the mobile terminal and cancelling a lock screen at the same time, it may make a short cut for the task to be displayed in advance in a prescribed form. And, if the short cut is selected, it may make the task stopped at the external device resume. Regarding this, it shall be described with reference to FIG. 13 in the following.

Figure 13:
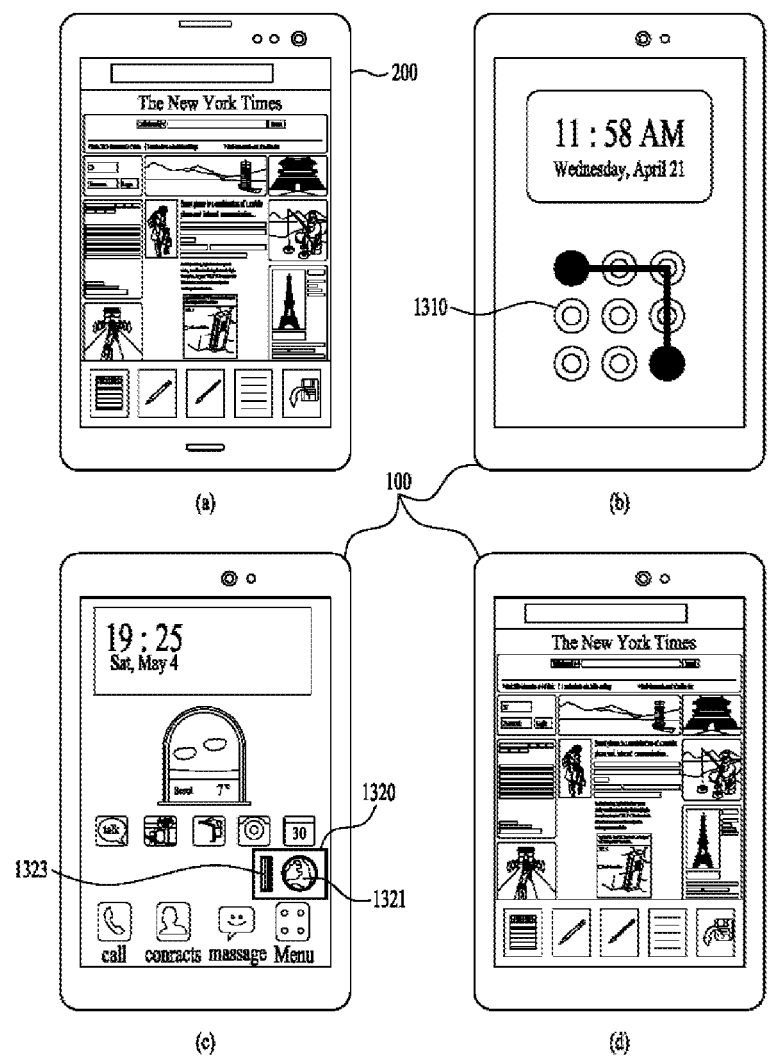
FIG. 13 is a diagram for an example of a method for a mobile terminal to provide continuity of a task according to a different embodiment of the present invention.

FIG. 13 is a diagram for an example of a method for a mobile terminal to provide continuity of a task according to a different embodiment of the present invention.

Referring to FIG. 13 (*a*), a web-browser is executed in the external device 200 and a webpage is displayed in the external device. In this case, as shown in FIG. 13 (*b*), if a lock screen state is cancelled in a manner that a lock screen of the mobile terminal 100 is called and a lock cancel pattern 1310 is inputted, as shown in FIG. 13 (*c*), a home screen can be displayed on the mobile terminal. Of course, if there was a different function in use before the mobile terminal enters the lock screen state, it may display a screen corresponding to the function instead of the home screen. When the lock screen state is cancelled, a display object 1320 (hereinafter called a 'sticker' for clarity) including an icon 1321 (in this case, a web browser icon) corresponding to a function lastly executed in the external device can be displayed on the home screen. The sticker 1320 may include a handle 1323. A user may change a position of the sticker 1320 by dragging the handle 1323. If the handle 1323 is selected by a simple touch input, the sticker 1320 may be disappeared from the home screen. If a part except the handle 1323 or the icon 1321 is selected from the sticker 1320, as shown in FIG. 13 (*d*), the web page lastly displayed on the external device can be displayed on the mobile terminal. In this case, the web browser is just an example for explaining provision of continuity using a sticker. In case of a multimedia playback application, if a sticker is selected, multimedia content lastly played in the external device can be played again from a timing point on which the multimedia has stopped. And, in case that a lock screen is configured not to be used, a sticker can be immediately displayed when a display of the mobile terminal is turned on. Moreover, a sticker can be displayed on a lock screen. When a sticker is displayed on the lock screen, if the sticker is selected, an application corresponding to the sticker can be immediately executed without a separate input for cancelling a lock screen state such as dragging an indicator, inputting a password and the like.

In FIG. 13, although it is assumed that a sticker corresponding to one application lastly used in the external device is displayed on a touch screen of the mobile terminal, this is just an example. The present invention may be non-limited to the example. A plurality of stickers respectively corresponding to a plurality of applications can be displayed on the touch screen of the mobile terminal as well. In particular, when a plurality of the applications operate in the external device in multitasking environment, not only a sticker corresponding to a lastly used application but also a sticker corresponding to an application operating as a background can be displayed on the touch screen of the mobile terminal. Or, when a plurality of the applications operate in the external device, it may display a sticker including an icon corresponding to the lastly executed application only in early stage. If a specific command is inputted on the sticker, it may display an icon corresponding to back ground applications in a manner of changing a size and/or a shape of the sticker. Besides, if a flicking touch input is detected on an icon, the controller 180 may change the icon displayed in the sticker according to such a prescribed rule as an execution order in the external device and the like while a shape of the sticker is maintained as it is. An example of the command inputted on the sticker may include a touch-drag command inputted on a boundary of the sticker or a handle and the like.

Meanwhile, according to one embodiment of the present invention, the aforementioned method can be implemented with a code readable by a processor in a recording media in which a program is recorded. The examples of the recording media readable by the processor may include a ROM, a RAM, a CD-ROM, a magnetic tape, a floppy disc, an optical data storing device and the like. And, implementing in a form of a carrier wave such as a transmission via the internet and the like is also included.

The aforementioned mobile terminal and a method of controlling therefor may not limitedly apply to the composition and method of the aforementioned embodiments. The aforementioned embodiments may be configured in a manner of being selectively combined the whole of the embodiments or a part of the embodiments to achieve various modifications.

What is claimed is:

1. A method of controlling a mobile terminal, the method comprising:
    establishing, via a wireless communication unit, communication with an external device including a first application;
    receiving a first input for displaying a lock screen on a display of the mobile terminal while the communication has been established between the mobile terminal and the external device;
    receiving, via a controller, application execution information of the first application from the external device;
    displaying first information of the first application on the lock screen according to the received application execution information in response to the first input, wherein the first information is associated with a content of a task that is being performed by executing the first application at the external device;
    executing a second application of the mobile terminal corresponding to the first information in response to a second input received via the first information displayed on the lock screen; and
    displaying, on the second application executed at the mobile terminal, the content of the task that is being performed by executing the first application at the external device, the content being displayed on the executed first application of the external device, and the lock screen no longer displayed on the display when the second application is executed at the mobile terminal.

2. The method of claim 1, wherein execution of the first application at the external device is continued when the second application is executed at the mobile terminal, the established communication with the external device maintained while the first application and the second application are executed concurrently.

3. The method of claim 1, wherein the first information comprises at least one of a screenshot of an execution screen of the first application lastly displayed on the external device, a name of the first application, or an icon corresponding to the first application.

4. The method of claim 1, further comprising:
    displaying a lock screen indicator on the lock screen,
    wherein the second input comprises dragging a pointer from the lock screen indicator to an area on the lock screen in which the first information is displayed.

5. The method of claim 1, further comprising synchronizing first contents included in the first application of the external device with second contents included in the second application of the mobile terminal.

6. The method of claim 5, further comprising:
    determining different contents by comparing the first contents with the second contents; and
    displaying a first indicator on each of the different contents.

7. The method of claim 6, wherein the synchronizing is performed when the first indicator is selected.

8. The method of claim 6, further comprising displaying a second indicator indicating that the synchronization is performed on each of the different contents.

9. A mobile terminal, comprising:
    a wireless communication unit configured to establish communication with an external device including a first application;
    a display; and
    a controller configured to:
        receive a first input for displaying a lock screen on the display while the communication has been established between the mobile terminal and the external device;
        receive application execution information of the first application from the external device;
        cause the display to display first information of the first application on the lock screen according to the received application execution information in response to the first input, wherein the first information is associated with a content of a task that is being performed by executing the first application at the external device;

execute a second application of the mobile terminal corresponding to the first information in response to a second input received via the first information displayed on the lock screen; and cause the display to display, on the second application executed at the mobile terminal, the content of the task that is being performed by executing the first application at the external device, the content being displayed on the executed first application of the external device, and the lock screen no longer displayed on the display when the second application is executed at the mobile terminal.

10. The mobile terminal of claim 9, wherein the first information comprises at least one of a screenshot of an execution screen of the first application lastly displayed on the external device, a name of the first application, or an icon corresponding to the first application.

11. The mobile terminal of claim 9, wherein:
the controller is further configured to cause the display to display a lock screen indicator on the lock screen; and
the second input comprises dragging a pointer from the lock screen indicator to an area on the lock screen in which the first information is displayed.

12. The mobile terminal of claim 9, wherein the controller is further configured to:
determine different contents by comparing first contents of the first application and second contents of the second application; and
cause the display to display a first indicator on each of the different contents.

13. The mobile terminal of claim 12, wherein the controller is further configured to synchronize the first contents with the second contents when the first indicator is selected.

14. A method of controlling a mobile terminal, the method comprising:
establishing, via a communication unit, communication with an external device including a first application;
receiving, via a controller, application execution information of the first application from the external device;
displaying an object corresponding to the first application on a display of the mobile terminal in response to releasing a lock screen of the mobile terminal, wherein the first application is an application that was lastly executed at the external device prior to the releasing of the lock screen, and the object is associated with a content of a task that was lastly displayed at the external device when the task was performed by executing the first application at the external device;
executing, via the controller, a second application of the mobile terminal corresponding to the object in response to selection of the object; and
displaying the content of the task that was lastly displayed on the executed first application of the external device on the second application of the mobile terminal.

15. The method of claim 14, wherein the object is displayed on a home screen that is displayed when the lock screen is released and the object comprises an icon corresponding to the first application.

16. The method of claim 15, wherein:
the object disappears from the home screen when a first part of the object is selected; and
the object and the home screen disappear from the display when a second part of the object is selected from the home screen to execute the second application.

17. A mobile terminal, comprising:
a wireless communication unit configured to establish communication with an external device including a first application;
a display; and
a controller configured to:
receive application execution information of the first application from the external device;
cause the display to display an object corresponding to the first application in response to releasing a lock screen of the mobile terminal, wherein the first application is an application that was lastly executed at the external device prior to the releasing of the lock screen, and the object is associated with a content of a task that was lastly displayed at the external device when the task was performed by executing the first application at the external device;
execute a second application of the mobile terminal corresponding to the first object in response to selection of the object; and
cause the display to display the content of the task that was lastly displayed on the executed first application of the external device on the second application of the mobile terminal.

18. The method of claim 4, wherein:
the lock screen indicator is visually changed when contacted by the pointer for the dragging;
the dragged pointer is released from the area of the lock screen; and
the mobile terminal is released from a lock screen state in response to the releasing of the dragged pointer from the area.

19. The method of claim 18, wherein the second application is executed when the mobile terminal is released from the lock screen state, the lock screen indicator no longer displayed when the second application is executed.

20. The method of claim 14, wherein, when the content is multimedia content, the method further comprises:
continuing displaying the content of the task that was lastly displayed on the executed first application of the external device on the second application of the mobile terminal from a timing point of the content at which displaying of the content was stopped at the external device.

* * * * *